United States Patent
Santhana Krishnan et al.

(10) Patent No.: US 12,108,246 B2
(45) Date of Patent: Oct. 1, 2024

(54) KEY REFRESHMENT WITH SESSION COUNT FOR WIRELESS MANAGEMENT OF MODULAR SUBSYSTEMS

(71) Applicant: Texas Instruments Incorporated, Dallas, TX (US)

(72) Inventors: Archanaa Santhana Krishnan, Worcester, MA (US); Alexis Justine Burnight, Dallas, TX (US); Ariton E. Xhafa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 327 days.

(21) Appl. No.: 17/314,865

(22) Filed: May 7, 2021

(65) Prior Publication Data
US 2022/0360979 A1    Nov. 10, 2022

(51) Int. Cl.
*H04W 12/04* (2021.01)
*H04W 12/041* (2021.01)
*H04W 12/0471* (2021.01)

(52) U.S. Cl.
CPC ..... *H04W 12/041* (2021.01); *H04W 12/0471* (2021.01)

(58) Field of Classification Search
CPC ............ H04W 12/041; H04W 12/0471
See application file for complete search history.

(56) References Cited

U.S. PATENT DOCUMENTS

| | | |
|---|---|---|
| 8,126,145 B1 * | 2/2012 | Tewari ............... H04W 12/50 |
| | | 370/428 |
| 9,293,935 B2 | 3/2016 | Lee |
| 10,703,211 B2 | 7/2020 | Chuang |
| 11,038,216 B2 | 6/2021 | Kwon |
| 11,483,824 B2 | 10/2022 | Lee |
| 2002/0172359 A1 * | 11/2002 | Saarinen ............... G06F 7/588 |
| | | 380/46 |
| 2005/0154896 A1 * | 7/2005 | Widman ............... H04L 9/12 |
| | | 713/182 |
| 2008/0159355 A1 | 7/2008 | Rengert |
| 2009/0044013 A1 * | 2/2009 | Zhu ..................... H04L 9/0891 |
| | | 713/170 |
| 2009/0296924 A1 * | 12/2009 | Oksman ............... H04L 9/321 |
| | | 380/255 |
| 2011/0150042 A1 | 6/2011 | Liu |
| 2016/0218866 A1 * | 7/2016 | Patil ..................... H04W 12/041 |

(Continued)

OTHER PUBLICATIONS

FIPS PUB 180-1 U.S. Department of Commerce Apr. 17, 1995 (Year: 1995).*

(Continued)

*Primary Examiner* — David J Pearson
(74) *Attorney, Agent, or Firm* — Carl G. Peterson; Frank D. Cimino

(57) ABSTRACT

A wireless interface includes: network formation circuitry configured to establish a wireless network between a primary node and a secondary node; data exchange circuitry configured to perform data exchanges between the primary node and the secondary node using secure sessions; and key refreshment circuitry configured to derive a new network key for the network based on a pre-shared key and a current network key concatenated with a session count. The new key is derived during at least one of the secure sessions.

21 Claims, 9 Drawing Sheets

(56) References Cited

U.S. PATENT DOCUMENTS

| | | | |
|---|---|---|---|
| 2017/0359717 A1* | 12/2017 | Adler | H04W 12/42 |
| 2018/0034815 A1* | 2/2018 | Thomas | H04W 12/03 |
| 2018/0287796 A1* | 10/2018 | Peper | H04L 9/3242 |
| 2019/0237816 A1 | 8/2019 | Kim | |
| 2019/0265304 A1 | 8/2019 | Kim | |
| 2019/0273293 A1* | 9/2019 | Kim | H01M 10/48 |
| 2019/0363815 A1 | 11/2019 | Bogenberger | |
| 2020/0007319 A1* | 1/2020 | Herzerg | H04L 9/0819 |
| 2020/0099672 A1* | 3/2020 | Persaud | H04L 9/16 |
| 2020/0305216 A1* | 9/2020 | Kim | H04W 76/19 |
| 2020/0366479 A1* | 11/2020 | Lee | H04L 9/0894 |
| 2020/0396688 A1 | 12/2020 | Hong | |
| 2021/0043983 A1 | 2/2021 | Choi | |
| 2021/0045109 A1* | 2/2021 | Lee | H01M 10/425 |
| 2021/0084675 A1 | 3/2021 | Aijaz | |
| 2021/0281988 A1 | 9/2021 | Han | |
| 2021/0319877 A1 | 10/2021 | Teng | |
| 2021/0377894 A1 | 12/2021 | Kamath | |
| 2022/0091062 A1 | 3/2022 | Gullapalli | |
| 2022/0113356 A1 | 4/2022 | Kasselman | |
| 2022/0179001 A1 | 6/2022 | Park | |
| 2022/0332213 A1 | 10/2022 | Xhafa | |
| 2022/0368364 A1 | 11/2022 | Martinez | |
| 2022/0417792 A1 | 12/2022 | Winder | |

OTHER PUBLICATIONS

Rivest The MD5 Message-Digest Algorithm RFC 1321 (Year: 1992).*

Texas Instruments. CC2642R SimpleLink(TM) Bluetooth(R) 5.2 Low Energy Wireless MCU. SWRS194H—Jan. 2018—Revised Mar. 2021. 66 pages.

Xhafa, et al., "Enabling Data Integrity in Wireless Devices Connected to Battery Monitor", Texas Instruments, Jun. 4, 2019, 4 pgs.

EM Microelectronic, EM9301 Datasheet, 2018, 51 pages (Year: 2018).

Song et al. "The AES-CMAC Algorithm", National Institute of Standards and Technology (NIST), 2006, "https://www.rfc-editor.org/ rfc/pdfrfc/rfc4493.txt.pdf", 20 pages (Year: 2006).

Nordic semiconductor, nRF25840 Datasheet, 2018, 551 pages (Year: 2018).

International Standard, ISO 26262-1, "Road vehicles—Functional Safety", International Organization for Standardization, Second Addition, Dec. 2018, 42 pgs.

Xhafa, et al., "Wireless Protocol for Battery Management Systems", Texas Instruments, Jun. 4, 2019, 6 pgs.

Xhafa, et al., U.S. Appl. No. 17/820,441, "Mesh Network During Keep Alive in Wireless Battery Management System", filed Aug. 17, 2022.

Kunduru, et al., U.S. Appl. No. 17/823,138, "Multiple Primary Nodes for Wireless Battery Management System Robustness", filed Aug. 30, 2022.

* cited by examiner

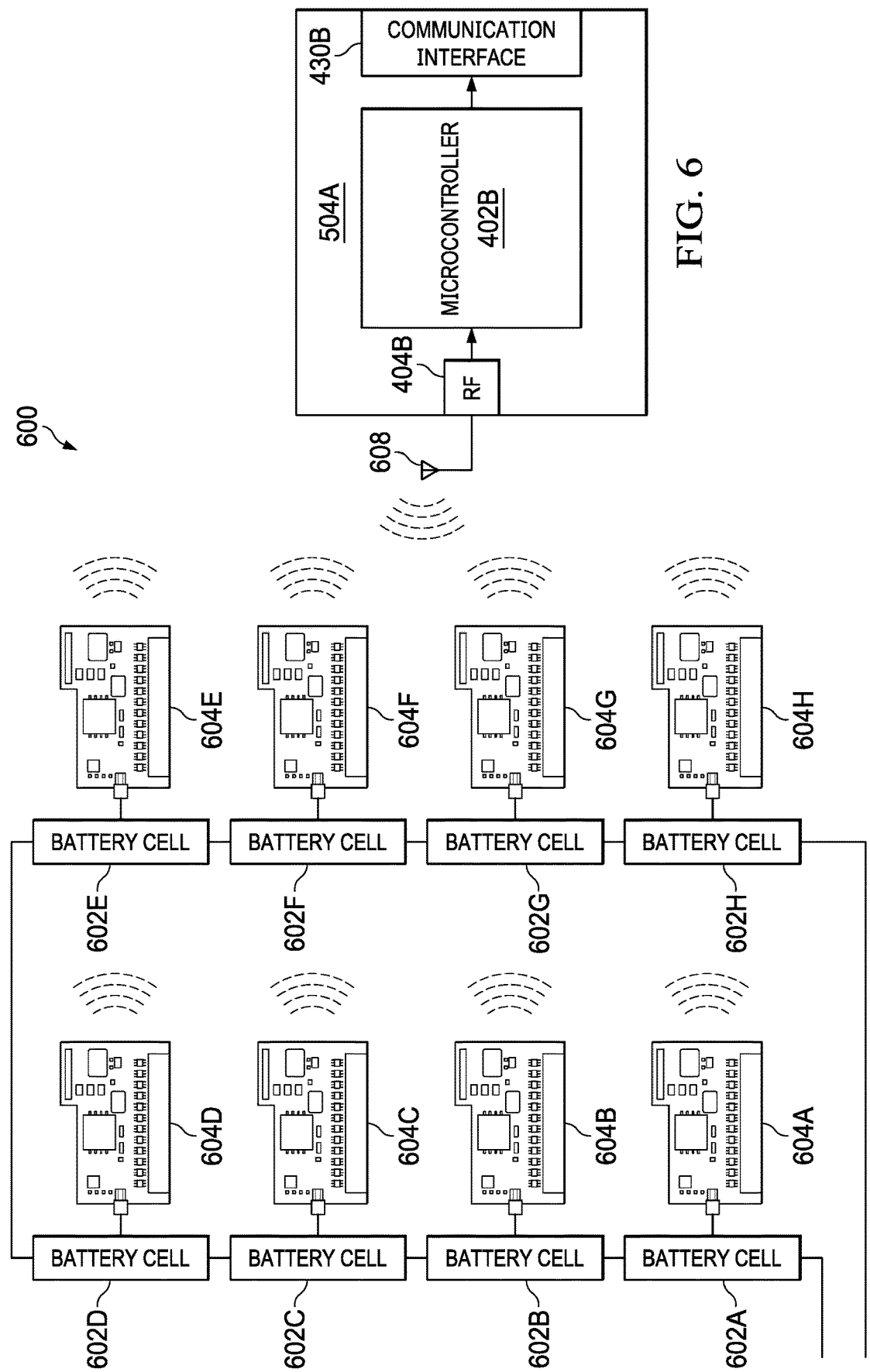

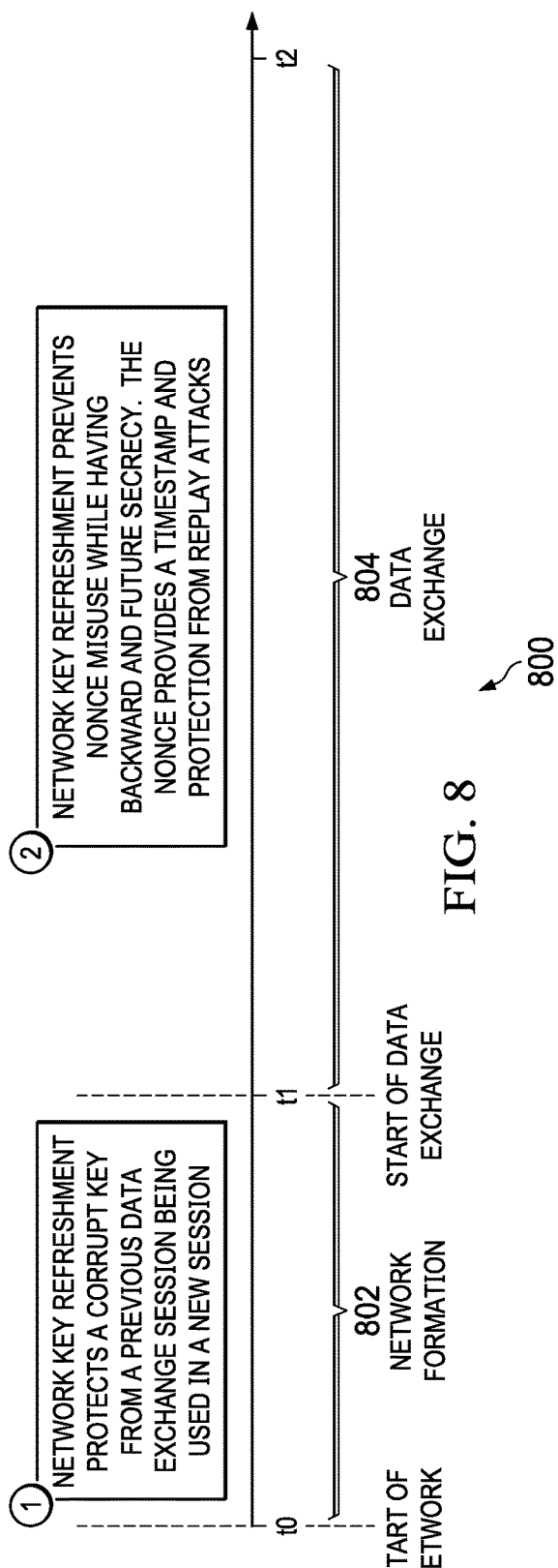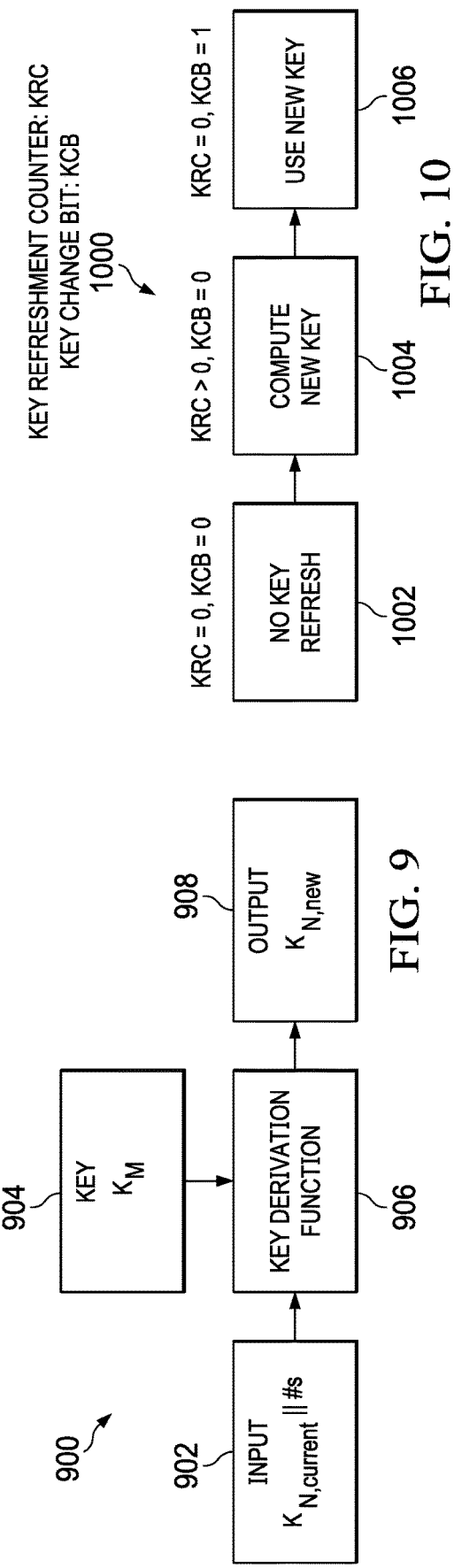

KEY REFRESHMENT WITH SESSION COUNT FOR WIRELESS MANAGEMENT OF MODULAR SUBSYSTEMS

BACKGROUND

As new electronic devices are developed and integrated circuit (IC) technology advances, new IC products are commercialized. One example IC product for electronic devices is a wireless transceiver or related subsystem. There are many different wireless communication protocols and related wireless transceivers to support different ranges of wireless data transmission, different levels of security, frequencies used, and/or other variations.

In many scenarios, two-way data secrecy is desired for wireless data communications. One strategy to help ensure secrecy is periodic key refreshment. However, periodic key refreshment and/or other security operations introduce overhead. A related issue is that key refreshment is difficult if all nodes are to be synchronized to use the same session key. The overhead and synchronicity complexity increases system cost and/or reduces overall throughput and latency of a wireless communication network and related transceivers.

One example system that benefits from use of wireless transceivers is a battery management system. In a conventional wired battery management system, rechargeable batteries are managed by circuitry for the safe and efficient operation of the batteries in real-life applications, such as electric vehicles. In a wired battery management system, wired communication interfaces are used to connect a main microcontroller to each battery module. Also, each battery module is chained to the rest of the battery modules in a daisy chain. With wired communication interfaces, the main microcontroller cannot monitor and control all the battery modules in parallel without complex wiring.

Use of a wireless connection between the battery modules and microcontrollers has been proposed to make management of battery modules more flexible and easier to repair. In a wireless battery management system (WBMS), a main microcontroller (primary node) monitors each battery module and communicates information to the main microcontroller using wireless communication interfaces. The main microcontroller controls all the secondary nodes using a WBMS protocol. Wireless communication interfaces for a WBMS are vulnerable to attacks introduced by wireless communication. The threats can be classified into three broad types: the introduction of a malicious node(s); passive capture of network data; and active injection of malicious data into the network as depicted in system 100 of FIG. 1.

At least some of the threats noted for system 100 of FIG. 1 can be prevented by encrypting and authenticating the data using a secret key. The secret key is used by cryptographic algorithms for several purposes including, but not limited to, scrambling the plaintext data to ensure that only authorized entities with secret keys can obtain the original message and providing integrity and authenticity guarantees. The secret keys must be refreshed frequently, for example in each session, to ensure forward secrecy and backward secrecy. Forward secrecy ensures security properties of current and future messages even if a secret key from the past was compromised. Backward secrecy ensures that new nodes joining a network cannot gain access to secured information from past sessions.

FIG. 2 shows a medium access control (MAC) protocol 200 for WBMS in accordance with a conventional approach. The MAC protocol 200 supports data exchanges between a primary node and N-secondary nodes in a WBMS. In FIG. 2, time is divided into slots and the primary node transmits packets in the downlink (DL) slot, while the secondary nodes transmit their data packets in the uplink (UL) slots. The time interval that includes a single DL slot (for the primary node to transmit) and the UL slots for the secondary nodes to transmit their packets is called a Superframe interval. While FIG. 2 shows data communication involving multiple secondary nodes, there are scenarios (e.g., in a scanning/joining phase) when the primary node and a single secondary node exchange a limited amount of information (e.g., sufficient secondary nodes to join the network).

A state diagram 300 of the network setup/formation for the WBMS protocol is illustrated in FIG. 3. In the state diagram 300 of FIG. 3, there is an unconnected state, a scanning state, a pairing/key exchange state, and a secure data exchange state. In the scanning state, the primary node broadcasts scan requests to the secondary nodes. Once a secondary node receives a scan request, it replies with a unicast scan response in the same Superframe and awaits a pairing request from the primary node. In the pairing/key exchange state, the primary node sends a unicast pairing request, which includes the network configuration such as channel hopping, dedicated slots, and so on. Upon receiving the pairing request, the secondary node replies with a pairing response after which all the secondary nodes have been paired and the network proceeds with the secure data exchange state.

The established key that is used in the network for encryption and authentication needs to be refreshed. The key refreshment is triggered when: a secondary node leaves a network due to the potential for the secondary node and related key to be compromised thereafter; a secondary node joins a network, because the secondary node needs to derive the network key; and the security frame counter rolls over. Without key refreshment, security principles are violated due to use of the same nonce and key pair, which is a combination of a node identifier (ID) and a security frame counter value used for encryption/MIC (message integrity code) generation of different packets.

If a secondary node leaves the network, all the remaining secondary nodes refresh their respective keys to maintain forward secrecy. If a new secondary node joins a network, it must perform a full key exchange with the primary node to obtain the network key and the pre-existing secondary nodes refresh their keys to maintain backward secrecy. If the nonce rolls over, the same nonce-key pair may be used for cryptographic operations, which may be exploited. Efforts to improve key refreshment and related security issues are ongoing.

SUMMARY

In at least one example, a wireless interface comprises: network formation circuitry configured to establish a wireless network between a primary node and a secondary node; data exchange circuitry configured to perform data exchanges between the primary node and the secondary node using secure sessions; and key refreshment circuitry configured to derive a new network key for the network based on a pre-shared key and a current network key concatenated with a session count. The new key is derived during at least one of the secure sessions.

In another example, a system comprises: modular subsystems, each of the modular subsystems having a respective monitored electrical component; a controller for the modular subsystems; and a wireless management system for the modular subsystems. The wireless management system includes: a primary node coupled to the controller; and secondary nodes, each secondary node coupled to or included with a respective modular subsystem of the modular subsystems. The wireless management system is configured to: establish a network with the primary node and the secondary nodes; perform data exchanges between the primary node and the secondary node using secure sessions; and during a current secure session, derive a new network key for a subsequent secure session.

In yet another example, a method comprises: establishing, by a wireless interface, a network with a primary node and a secondary node; performing, by the wireless interface, data exchanges between the primary node and the secondary node using secure sessions; and during a current secure session, deriving, by the wireless interface, a new network key for a subsequent secure session of the network based on a pre-shared key and a current network key concatenated with a session count.

BRIEF DESCRIPTION OF THE DRAWINGS

FIG. 6 is a diagram of a WBMS in accordance with an example embodiment.

FIG. 8 is a timing diagram of wireless management involving key refreshment with session count in accordance with an example embodiment.

FIG. 9 is a diagram of a key derivation function in accordance with an example embodiment.

FIG. 10 is a state diagram of key refreshment using a security header in accordance with an example embodiment.

DETAILED DESCRIPTION

Figure 1:
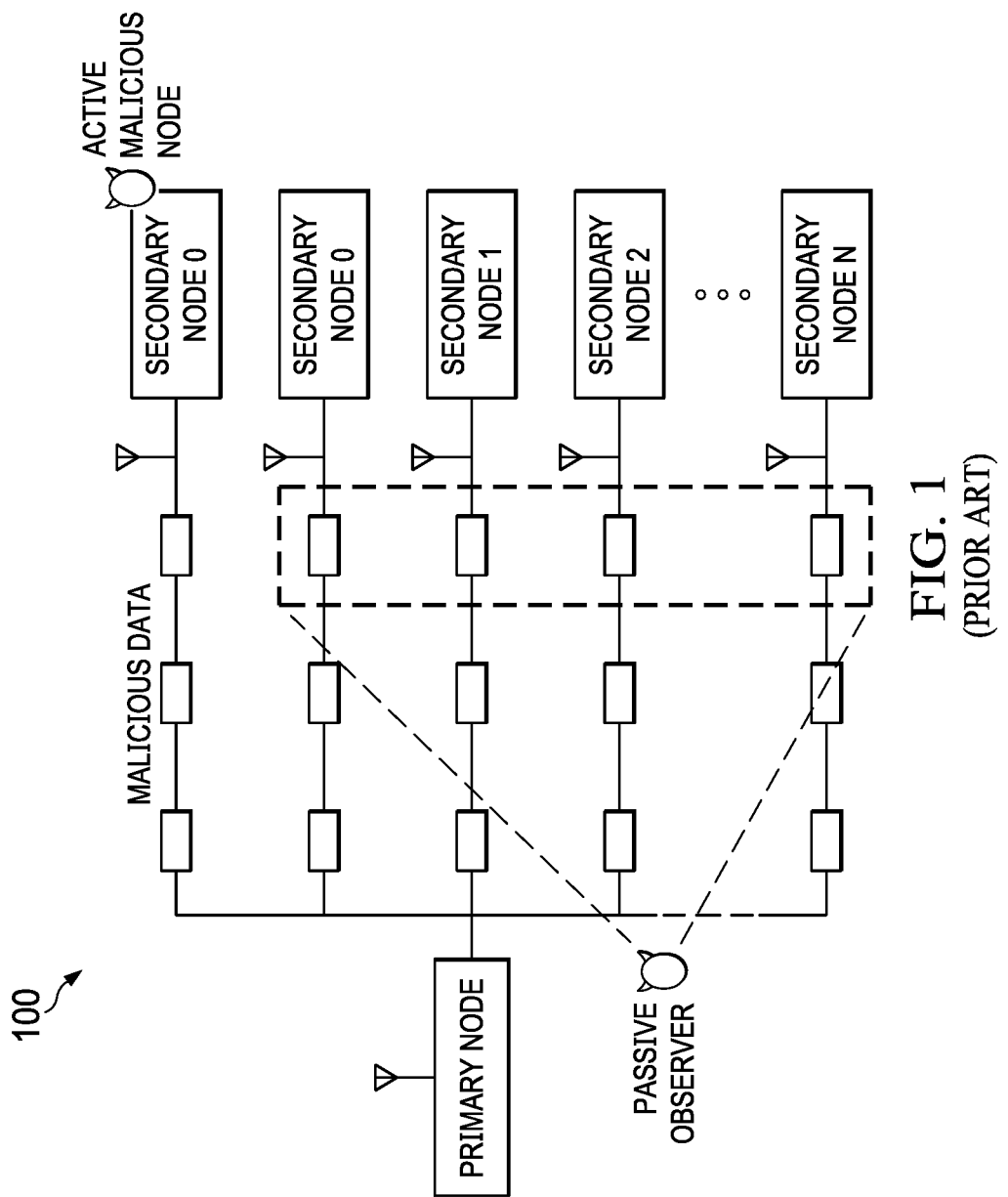
FIG. 1 is a block diagram of a Wireless Battery Management System (WBMS) and potential attacks in accordance with a conventional approach.
Figure 2:
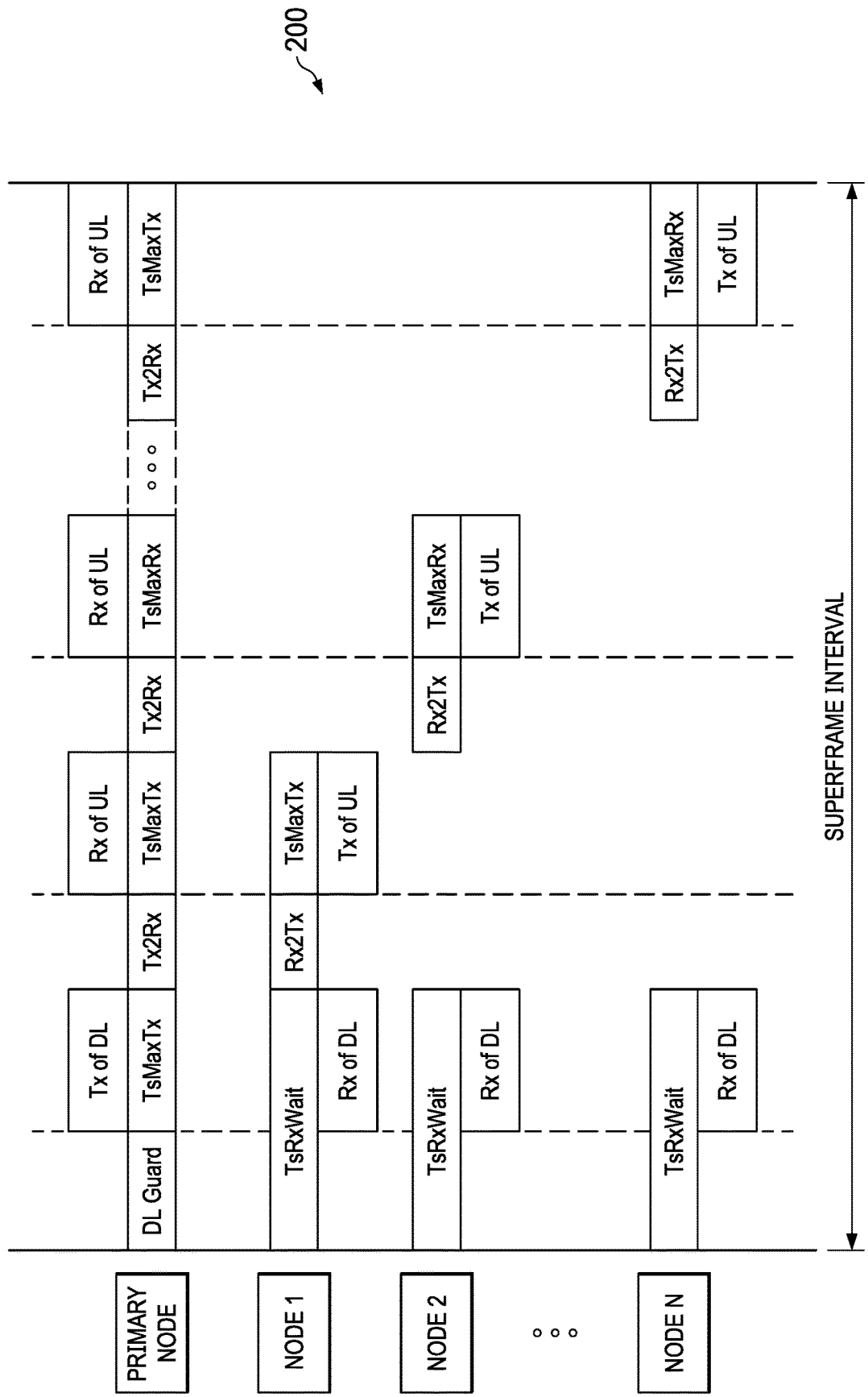
FIG. 2 is a diagram of the medium access control (MAC) protocol for a WBMS in accordance with a conventional approach.
Figure 3:
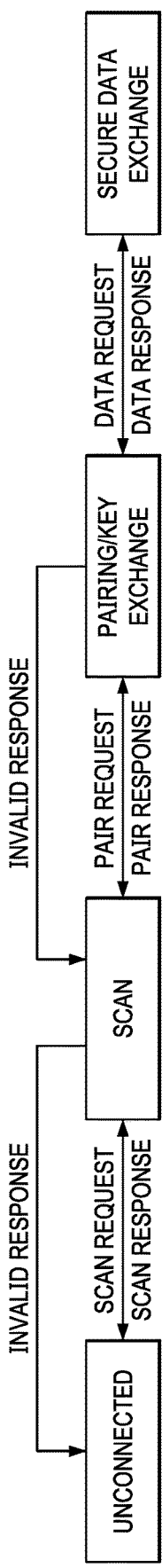
FIG. 3 is a state diagram for a secure connection in a WBMS in accordance with a conventional approach.

Described herein is a key refreshment technique with session count to ensure forward secrecy, backward secrecy, and nonce-key pair reuse prevention during wireless management of modular subsystems. In some example embodiments, key refreshment with session count is performed during unicast and/or broadcast communications of a wireless management protocol by associating a session number with each network key. Without limitation, the wireless management protocol is used in a wireless battery management system (WBMS) for a vehicle or other system with battery cells. The session count is set to zero when the network is initially formed. The session count is later incremented each time the network key is refreshed. During scanning and pairing, the session count of the primary node and related secondary nodes are checked to identify if all the devices have the same session count and corresponding network key. In the event of a session count rollover, key refreshment is performed for all the secondary nodes in the network. In some example embodiments, the key is refreshed using a different algorithm for each type of communication (e.g., unicast or broadcast).

In some example embodiments, described key refreshment technique refreshes keys using a key derivation function that use the current network parameters as input. With the described key refreshment technique, key refreshments are carried out only as needed, and redundant key exchanges are replaced with key refreshment to improve overall latency. The described key refreshment technique ensures uninterrupted data protocol execution in case key refreshment is needed during broadcast communications. The introduction of a session count provides an opportunity to identify if the primary node and the secondary nodes have the same network key. The session count also aids in reducing unnecessary key exchange when the session count matches. The provision to refresh keys on-the-fly during broadcast communication ensures uninterrupted data exchange with state-of-the-art security features.

In some example embodiments, establishment of a network begins with a scanning phase in which a primary node uses broadcast communications to scan or poll for existence of secondary nodes and to request that secondary nodes join the network. After the scanning phase, a pairing phase begins in which the primary node uses unicast communications to exchange network and security parameters with each respective secondary nodes. During the pairing phase, key exchange is performed between the primary and secondary nodes. After the pairing phase, a data exchange phase begins in which the primary node uses broadcasting communications for data exchanges with the secondary nodes. In some example embodiments, once a network has been formed, at least some of the network and security parameters are stored to expedite forming the network again later with a new key. In some scenarios, one of more secondary nodes may go offline for a time and fall behind with regard to key derivation operations. In such case, communications of the network are not interrupted while such secondary nodes catch up on their key derivation operations. To reduce overhead, another key exchange is avoided with key derivation operations for a subsequent session or to catch up to a current session.

Figure 4:
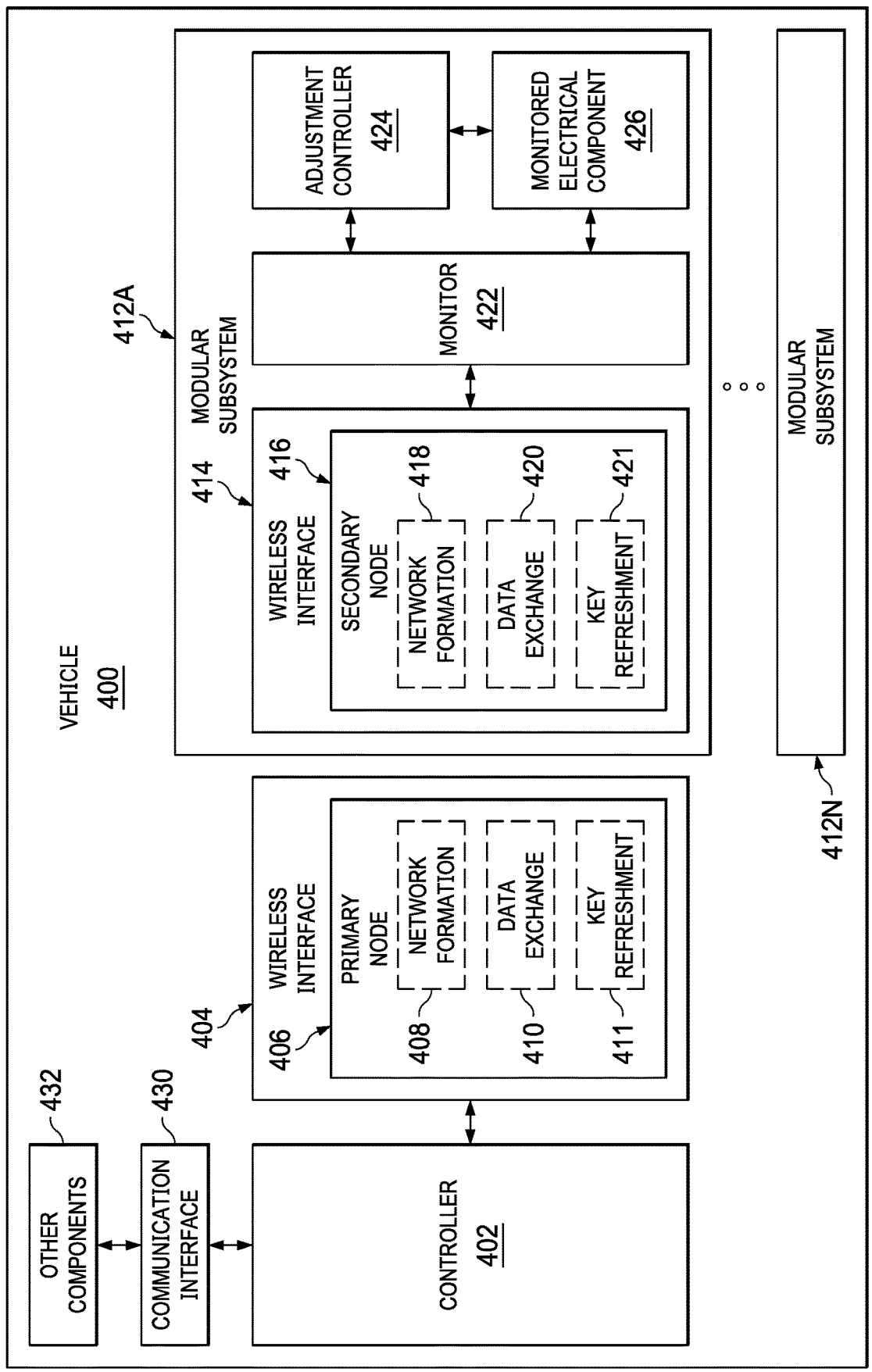
FIG. 4 is a block diagram of a system with wireless management of modular subsystems in accordance with an example embodiment.

FIG. 4 is a block diagram of a system 400 with wireless management of modular subsystems 412A-412N in accordance with an example embodiment. As shown, the system 400 includes a controller 402 coupled to a wireless interface 404 with a primary node 406. In some example embodiments, the wireless interface 404 is part of a circuit or integrated circuit (IC) configured to provide wireless management of modular subsystems, such as the modular subsystems 412A-412N. Example components of the circuit or IC include a microcontroller, memory (e.g., flash memory, static random-access memory, read-only memory, etc.), a radio frequency (RF) transceiver, power converters, sensors, peripherals, analog-to-digital converters (ADCs), and digital-to-analog converters (DACs). In some example embodiments, the circuit or IC with the wireless interface 404 may store instructions in memory to support various operations including wireless communications and related network formation, data exchange, and key refreshment. In some example embodiments, the circuit or IC with the wireless interface 404 may use a communication protocol stack with physical layer components, RF layer components, a host controller interface, a host layer, and an application layer. Without limitation, the network formation, the data exchange, and the key refreshment operations described herein for the wireless interface 404 or primary node 406 involve: one or more layers of a communication protocol stack (e.g., Bluetooth, Bluetooth Low Energy, or a proprietary communication protocol stack); storing configuration parameters for these layers in secure storage; and/or executing related instructions while maintaining security during a scanning phase, a pairing phase, and a data exchange phase. In the data exchange phase, secure sessions are used for data exchange, where key refreshment for each new session is performed without interrupting the current secure session.

After an initial pairing phase, the primary node 406 and the secondary nodes (e.g., the secondary node 416) are configured to perform key refreshment locally to support a subsequent secure session without interrupting the current secure session. As needed, new secondary nodes may be added to the network, or secondary nodes that go offline can return to the network and determine the current network key and/or new network key without interrupting ongoing data exchanges of the current secure session.

In some example embodiments, the primary node 406 of the wireless interface 404 performs various network management operations using network formation circuitry 408, data exchange circuitry 410, and key refreshment circuitry 411. The network formation circuitry 408, the data exchange circuitry 410, and the key refreshment circuitry 411 include the circuitry or IC components described for the wireless interface 404 and/or related instructions configured to perform network management operations by the primary node 406. Specifically, the network formation circuitry 408 causes the primary node 406 to form a network using a scanning phase and a pairing phase as previously described. In the scanning phase, broadcast communications are used to poll secondary nodes to join the network. In the pairing phase, the network formation circuitry 408 causes the primary node 406 to exchange network and security information with secondary nodes that will join the network. In the pairing phase, unicast communications are used with each respective secondary node.

After the network is formed and pairing has been established, the data exchange circuitry 410 causes the primary node 406 to perform data exchanges using sessions and the key refreshment circuitry 411. For each session, a new key is derived locally by each of the primary node 406 and the secondary nodes (e.g., the secondary node 416). As needed, a particular secondary node performs catch up key derivation operations (e.g., if the particular secondary node went offline for a time). With the described key refreshment operations (supported by the data exchange circuitry 410 and key refreshment circuitry 411, key exchange is avoided for new session key derivation operations and/or catch up key derivation operations (i.e., the key refreshment operations are performing during each secure session without interrupting secondary nodes with the current key). The described technique of performing key derivation with session count during the data exchange phase reduces network downtime and latency (by allowing ongoing communication and avoiding another unicast key exchange operation), while providing secure communications (e.g., forward secrecy, backward secrecy, and nonce-key pair reuse prevention).

In some example embodiments, the wireless interface 404 is a separate IC relative to the controller 402 for the modular subsystem 412A-412N. In operation, the controller 402 is configured to provide control signals modular subsystems 412A-412N, analyze monitored parameters obtained from the modular subsystems 412A-412N, and provide updated control signals to the modular subsystem 412A-412N responsive to analysis results and/or related changes to the monitored electrical components (e.g., the monitored electrical component 426). In other example embodiments, the wireless interface 404 and the controller 402 for the modular subsystems 412A-412N are part of a single IC.

As shown, the modular subsystem 412A includes a wireless interface 414 with a secondary node 416. In some example embodiments, the wireless interface 414 is part of a circuit or IC configured to monitor and adjust operations of a respective monitored electrical component 426 (e.g., a rechargeable battery). Example components of a circuit or IC that includes the wireless interface 414 include cell balancing circuitry, ADCs, DACs, memory (e.g., flash memory, static random-access memory, read-only memory, etc.), a radio frequency (RF) transceiver, power converters, sensors, and peripherals. In some examples, the circuit or IC with the wireless interface 414 stores instructions in memory to support various operations including wireless communications with the primary node 406 and related network formation, data exchange, and key refreshment. As an example, the circuit or IC with the wireless interface 414 may use a communication protocol stack with physical layer components, RF layer components, a host controller interface, a host layer, and an application layer. Without limitation, the network formation, the data exchange, and the key refreshment operations described herein for the wireless interface 414 or related secondary node 416 may involve: one or more layers of a communication protocol stack (e.g., Bluetooth, Bluetooth Low Energy, or a proprietary communication protocol stack); storing configuration parameters for these layers in secure storage; and/or executing related instructions while maintaining security during a scanning phase, a pairing phase, and a data exchanges phase. In the data exchange phase, secure sessions are used for data exchange, where key refreshment for each new session is performed without interrupting the current secure session.

After an initial pairing phase, the secondary nodes (e.g., the secondary node 416) are configured to perform key refreshment locally to support a subsequent secure session without interrupting the current secure session. As needed, new secondary nodes may be added to the network, or secondary nodes that go offline can return to the network and determine the current network key and/or new network key without interrupting ongoing data exchanges of the current secure session.

In the example of FIG. 4, the secondary node 416 performs network management operations using network formation circuitry 418, data exchange circuitry 420, and key refreshment circuitry 421. The network formation circuitry 418, the data exchange circuitry 420, and the key refreshment circuitry 421 include the circuitry or IC components described for the wireless interface 414 and/or related instructions configured to perform network management operations by the secondary node 416. Specifically, the network formation circuitry 418 causes the secondary node 416 to respond to polls or queries to join a network during a scanning phase and a pairing phase as previously described. In the pairing phase, unicast communications between the primary node 406 and the secondary node 416 are used exchange network and security parameters, including a key exchange. As needed, the primary node 406 and the secondary node 416 include storage, which may be used to store the keys obtained during a paring phase.

After the network is formed and pairing has been established, the data exchange circuitry 420 causes the secondary node 416 to perform data exchanges using sessions and the key refreshment circuitry 421. For each session, a new key is derived locally by the primary node 406 and each secondary node (e.g., the secondary node 416). As needed, the secondary node 416 performs catch up key derivation operations (e.g., if the secondary node 416 goes offline for a time). With the described key derivation operations (supported by the data exchange circuitry 420 and key refreshment circuitry 421, key exchange is avoided for new session key derivation operations and/or catch up key derivation operations. In other words, the key derivation operations are performing during each secure session without interrupting data exchanges by secondary nodes with the current key). The described technique of performing key refreshment with session count during the data exchange phase reduces network downtime and latency (by allowing ongoing communication and avoiding another unicast key exchange operation), while providing secure communications (e.g., forward secrecy, backward secrecy, and nonce-key pair reuse prevention).

In some example embodiments, each of the wireless interface 404 for the primary node 406 and the wireless interfaces (e.g., the wireless interface 414) for the secondary nodes (e.g., the secondary node 416) includes a processor and storage (part of the respective network formation circuitry, data exchange circuitry, and key refreshment circuitry). The storage is used to store instructions, settings, device identifiers (IDs), and/or other information used by the processor to perform network formation, data exchange, and/or key refreshment as described herein. As needed, application programming interface (API) calls are used to communicate between layers of a network stack to perform network formation, data exchange, and/or key refreshment as described herein. Without limitation, network formation (e.g., performed by the network formation circuitry 408 and/or the network formation circuitry 418) involves keeping track of the network and the devices therein. In some example embodiments, the network formation circuitry 408 includes storage (e.g., registers or other storage) configured to store network information such as the device IDs and/or their respective state (e.g., sent a scan response, not yet done pairing, not yet assigned a slot, etc.). Without limitation, data exchange (e.g., performed by the data exchange circuitry 410 and/or the data exchange circuitry 420) involves keeping track of the data exchanges between the primary node 406 and the secondary nodes (e.g., the secondary node 416) of the modular subsystems 412A-412N. In some example embodiments, the data exchange circuitry 410 and/or the data exchange circuitry 402 is configured to: track if a data frame is acknowledged; track the information in the header of frames sent; create/process the data frame header; append/decapsulate the payload; and call on a security module to encrypt/decrypt the data. Without limitation, key refreshment (e.g., performed by the key refreshment circuitry 411 and/or the key refreshment circuitry 421) involving keeping track of any keys and deriving new keys. New keys are derived using key derivation function and the inputs as described herein.

In the example of FIG. 4, the modular subsystem 412A includes a monitored electrical component 426. In some example embodiments, the monitored electrical component 426 is a rechargeable battery or another component with a variable status. To account for the variable status of the monitored electrical component 426, the modular subsystem 412A includes a monitor 422 configured to monitor parameters or operations of the monitored electrical component 426. The modular subsystem 412A also includes an adjustment controller 424 configured to make adjustments to the monitored electrical component 426.

Without limitation, each of the modular subsystems 412B-412N may have the same topology as the modular subsystem 412A. As desired, the functionality of monitored electrical components, such as the monitored electrical component 426, for each of the modular subsystems 412B-412N is combined and the combined functionality of all of the monitored electrical components is also monitored and adjusted as needed. Over time, the performance of the monitored electrical components and/or other components of the modular subsystem 412A-412N may degrade. In such case, adjustment or replacement of a specific monitored electrical component or other components of a given modular subsystem may be needed. By using the wireless interfaces 404 and 414, such replacement is facilitated (i.e., fewer wired connections are used) while supporting monitoring, adjustment, status update, parameter transfer, and/or data storage operations for the monitored electrical components of the modular subsystems 412A-412N. The use of key refreshment with session count in the system 400 enables forward secrecy, backward secrecy, and nonce-key pair reuse prevention for wireless communications.

In FIG. 4, the controller 402 is also coupled to other components 432 via a communication interface 430. An example of the other components 432 is an electronic control unit (ECU), which manages the electrical subsystems of a vehicle or other system responsive to the ongoing status and operations of the modular subsystems 412A-412N.

Figure 5:
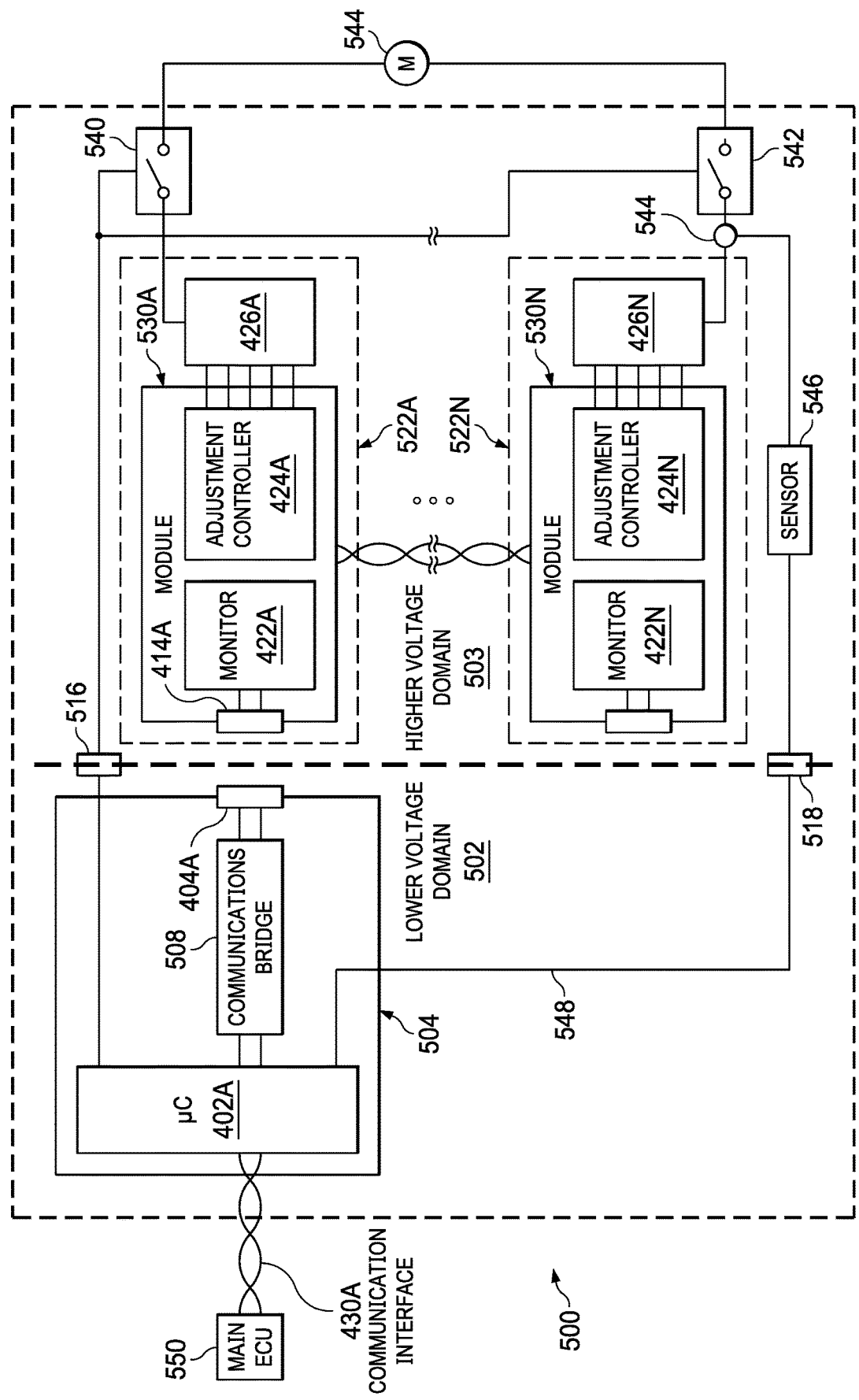
FIG. 5 is a block diagram of a system with wireless management of modular subsystems in accordance with another example embodiment.

FIG. 5 is a block diagram of a system 500 with wireless management of modular subsystems 522A-522N (examples of the modular subsystems 412A-412N in FIG. 5) in accordance with another example embodiment. In FIG. 5, the system 500 includes a lower voltage (e.g., 12, 24, or 48 volts) domain 502 with a control circuit 504. In the example of FIG. 5, the modular subsystems 522A-522N are in a higher voltage (e.g., several hundreds of volts) domain 503 compared to the control circuit 504. As shown, the control circuit 504 includes a microcontroller 402A (an example of the controller 402 in FIG. 4) and a wireless interface 404A (an example of the wireless interface 404 in FIG. 4). The control circuit 504 also includes a communications bridge 508 between the microcontroller 402A and the wireless interface 404A. In the example of FIG. 5, a main ECU 550 for the system 500 is coupled to the control circuit 504 via a communication interface 430A (an example of the communication interface 430 in FIG. 4). In operation, the wireless interface 404A performs network management operations including key refreshment operations with session count as described herein.

As shown, the modular subsystem 522A includes a module 530A, such as a printed circuit board (PCB) or other circuit, with a wireless interface 414A (an example of the wireless interface 414 in FIG. 4), a monitor 422A (an example of the monitor 422 in FIG. 4), and an adjustment controller 424A (an example of the adjustment controller 424 in FIG. 4). The module 530A is coupled to a monitored electrical component 426A (an example of the monitored electrical component 426 in FIG. 4). The modular subsystems 522B-522N each include a respective module 530B-530N coupled to a respective monitored electrical component 426B-426N. In some example embodiments, the monitored electrical components 426A-426N are rechargeable batteries or other components with a variable status. Without limitation, each the modules 530B-530N include the same type of components as the module 530A (e.g., wireless interface, a monitor, and an adjustment controller).

In FIG. 5, the wireless interface 404A includes a primary node, and each of the wireless interfaces 414A-414N include a secondary node as described herein. Also, the monitored electronic components 426A-426N may be coupled together to provide a combined function. As shown, the system 500 includes switches 540, 542, and component 544. In some example embodiments, the component 544 is a motor/engine. In this case, closing the circuit at 540 and 542, results in current flowing through the engine/motor to operate a vehicle. During the parking or when the car is OFF, the circuit is open and no energy is wasted. The switches 540 and 542 are controlled by a control signal from the microcontroller 402A, which is conveyed to the switches 540 and 542 via interface 516. In FIG. 5, the microcontroller 402A also receives a current sense signal 548 via interface 518, where the current sense signal 548 is generated from a loop 544 or related sensor 546.

In operation, the network interface 404A is configured to perform primary node key refreshment operations with session count. Also, the network interface 414A is configured to perform secondary node key refreshment operations with session count. As desired, the functionality of the monitored electrical components 426A-426N is combined and the combined functionality of all of the monitored electrical components is also monitored and adjusted. Over time, the performance of the monitored electrical components 426A-426N and/or other components of the modular subsystem 522A-522N may degrade. In such case, adjustment or replacement of a specific monitored electrical component or other components of a given modular subsystem may be needed. By using the wireless interfaces 404A and 414A, such replacement is facilitated while supporting monitoring, adjustment, status update, parameter transfer, and/or data storage operations for the monitored electrical components 426A-426N of the modular subsystems 522A-522N. The use of key refreshment with session count in the system 500 enables forward secrecy, backward secrecy, and nonce-key pair reuse prevention during wireless managements of the modular subsystems 522A-522N.

FIG. 6 is a diagram of a WBMS 600 in accordance with an example embodiment. As shown, the WBMS 600 includes battery cells 602A-602H (e.g., Li-ion cells) in series. Each of the battery 602A-602H is coupled to a respective module 604A-604H (examples of the modules 522A-522N) to form respective modular subsystems (e.g., the battery cell 602A and the module 604A is an example of a modular subsystem as described herein). The modules 602A-602H perform monitoring, adjustment, and/or wireless communication operations, including secondary node key refreshment operations with session count as described herein. The WBMS 600 also includes a control circuit 504A (an example of the control circuit 504 in FIG. 5) with a microcontroller 402B (an example of the microcontroller 402 in FIG. 4), a wireless transceiver 404B (an example of the wireless transceiver 404 in FIG. 4), and a communication interface 430B (an example of the communication interface 430 in FIG. 4). The control circuit 504A is coupled to an antenna 608 for wireless communications with the modules 604A-604H. In operation, the wireless transceiver 404B is configured to perform primary node key refreshment with session count as described herein.

With the WBMS 600, the functionality of the battery cells 602A-602H is combined and the combined functionality of all of the battery cells 602A-602H is monitored and adjusted. Over time, the performance of the battery cells 602A-602H may degrade. In such case, adjustment or replacement of a specific one of the battery cells 602A-602H or other components of the modular subsystems may be needed. By using the wireless interfaces 404B and respective wireless interfaces (e.g., wireless interface 414) of the modules 604A-604H, such replacement is facilitated while supporting monitoring, adjustment, status update, parameter transfer, and/or other operations related to the battery cells 602A-602H. The use of key refreshments with session count in the WBMS 600 enables forward secrecy, backward secrecy, and nonce-key pair reuse prevention for wireless communications.

Figure 7:
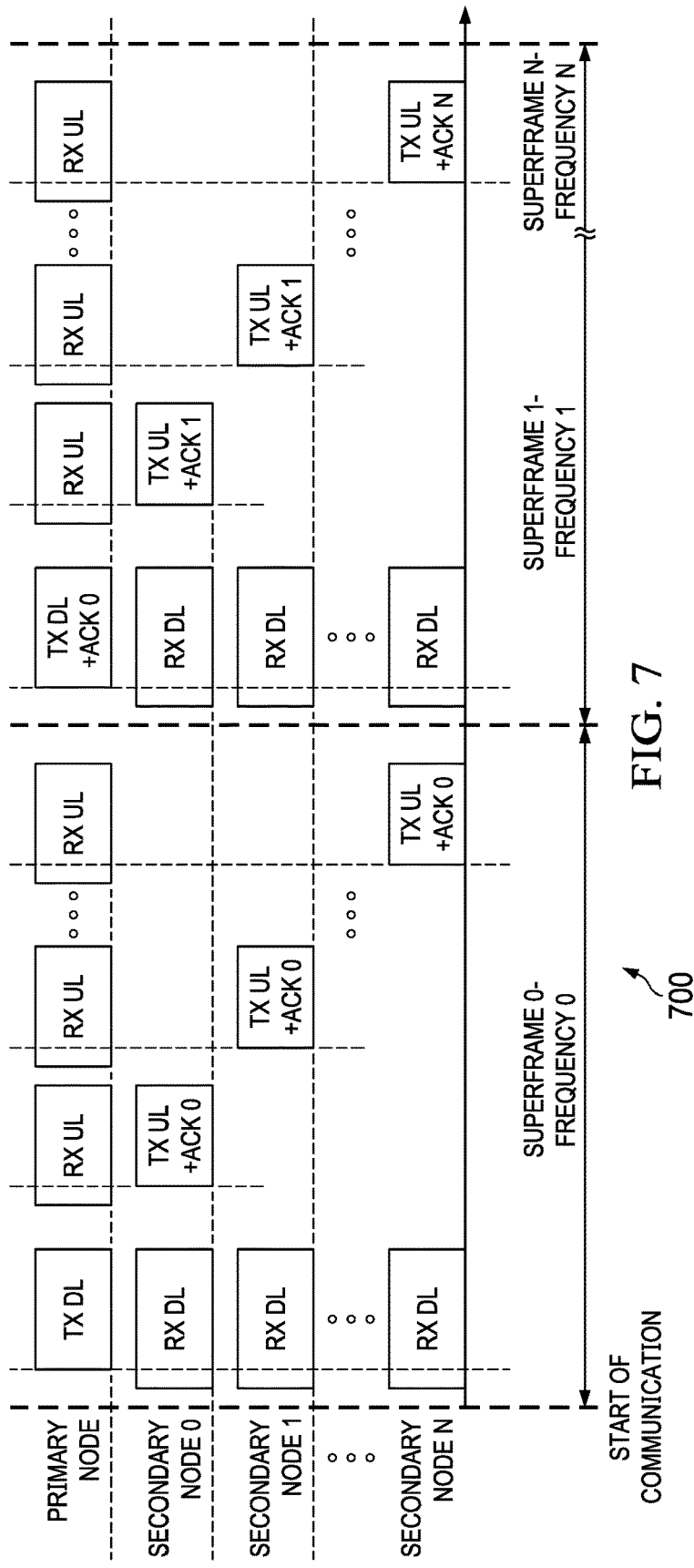
FIG. 7 is a diagram of a wireless management network protocol in accordance with an example embodiment.

FIG. 7 is a diagram of a wireless management network protocol 700 in accordance with an example embodiment. The protocol 700 supports data exchanges between a primary node and N-secondary nodes in a WBMS. In FIG. 7, time is divided into slots and the primary node transmits packets in the downlink (DL) slot, while the secondary nodes transmit their data packets in the uplink (UL) slots. The time interval that includes a single DL slot (for the primary node to transmit) and the UL slots for the secondary nodes to transmit their packets is called a Superframe interval. In the wireless management network protocol 700, N Superframes are represented. While FIG. 7 shows data communication involving multiple secondary nodes, there are scenarios (e.g., in a scanning/joining phase) when only the primary node and a single secondary node exchange the necessary information that is needed for the secondary nodes to join a network. In the wireless management network protocol 700, key refreshment with session count is performed for each new Superframe without interrupting ongoing data exchange operations. If a secondary node goes offline for a time, it may perform catch up key refreshment operations until a current key is derived. The key refreshment operations do not involve key exchange and repetition of network parameters. As desired, the key exchange and network parameters are securely stored by each secondary node.

FIG. 8 is a timing diagram 800 of wireless management involving key refreshment with session count in accordance with an example embodiment. The timing diagram 800 shows a network formation interval 802 between times t0 and t1. During the network formation interval 802, key refreshment protects a corrupt key from a previous secure session being used in a new session. The timing diagram 800 also shows a data exchange interval 804 between times t1 and t2. During the data exchange interval 804, key refreshment prevents nonce misuse while maintaining backward and forward secrecy. The nonce provides protection from replay attacks.

FIG. 9 is a diagram 900 of a key derivation function 906 in accordance with an example embodiment. In the diagram 900, the key derivation function 906 receives inputs 902 and 904, and provides output 908 as part of a key refreshment with session count. The input 902 is the current network information (the current key concatenated with the session count or "$K_{N,current}||\#s$"). The input 904 is a pre-shared key ($K_M$), which is used as a secret key. The output 908 is the new key ($K_{N,new}$). In some example embodiments, the key derivation function 906 uses the current network information (input 902) to compute the new network key. The new key should have the following properties. First, a secure key derivation function 906 is used to ensure the new key is unrelated to the old key. Second, the new key is a keyed function to ensure only authorized parties with the key can compute the new key. Third, the new key is a one-way function, where the input cannot be derived with the knowledge of the output, to ensure forward secrecy. In some example embodiments the key derivation function 906 uses a Hashed Message Authentication Function as a keyed on-way function to derive the new key.

In the described key refreshment technique, the session count is incremented when the network starts using the new network key, $K_{N,new}$, in the data exchange phase. In some example embodiments, the key refreshment uses three fields in the security section of the MAC header, listed in Table 1.

TABLE 1

Security section of a MAC header

| Octets: 0-4 | | |
|---|---|---|
| 1 | | |
| Bits: 0-31 | | |
| 0-3 | 4 | 5-7 |
| Frame counter | Key refreshment counter | Key change bit | Reserved |

As shown in Table 1, the network uses a frame counter, which keeps track of the frames sent between a primary node and its secondary nodes. The frame counter is used to construct the nonce used by cryptographic operations. Also, the frame counter is reset to zero when the network starts using a new key, to ensure the same nonce-key pair is never reused. In some example embodiments, key refreshments are based on a three-bit counter, which is used by the primary node as key refreshment counter to indicate a call for key refreshment to the nodes. When a secondary node receives a non-zero counter value, the secondary node knows that it has that many Superframes to generate the new network key. Also, key refreshments use a key change bit to indicate the start of the use of the new network key. The key change bit is used by the primary node to indicate that it started using the new network key.

FIG. 10 is a state diagram 1000 of key refreshment using a security header in accordance with an example embodiment. The state diagram 1000 describes the states of secondary nodes depending on the security header received from the primary node. In the state diagram 1000, there are two values that affect the state. These values are a key refreshment counter (KRC) value (e.g., a 3-bit counter count as shown in Table 1) and a key change bit (KCB) value. As shown in the state diagram 1000, no key refresh is needed at state 1002 if KRC=0 and KCB=0. At state 1004, a new key is computed if KRC>0 and KCB=0. At state 1006, the new key is used if KRC>0 and KCB=0. When the node receives a set key change bit, it updates its network key with the new network key, and increments its session count.

In some example embodiments, key refreshment with session count is carried out in unicast communication when there are one or more nodes whose session number did not match with that of the primary. This situation may arise when a new node joins the network or due to memory corruption in existing nodes. The key refreshment is performed in one Superframe for nodes whose session numbers match with that of the primary. In a unicast downlink message, the primary node uses the security header to initiate key refreshment during by setting the key change bit and resetting the key refreshment counter. When the wireless interface receives this downlink message, it performs key derivation over the current network key and session number, updates the output as its network key, increments the session number, and replies with a unicast uplink message whose key change bit it set, which is used as an acknowledgement (ACK) for the key refreshment. When the primary node receives a pairing response from all its secondary nodes with the ACK, the primary node updates its network key, increments its session count, and resets the frame counter.

In some example embodiments, key refreshment with session count is performed during broadcast communications when the session count of all nodes matches with that of the primary, for example, when key refreshment is required when the frame counter rolls over during data exchange state of the wireless battery management protocol. This option provides a method to refresh keys on-the-fly during broadcast communication, where the method uses the security header to initiate and completes the key exchange using the following steps.

First, the primary initiates the key refreshment by setting the key refreshment counter in the security header to any number greater than zero in its broadcast downlink message. The counter corresponds to the number of Superframes the secondary nodes have to compute their new network key and acknowledge the key refreshment request. At the same time, the primary node also computes its new network key. With every subsequent downlink packet, the primary node decrements the key refreshment counter. Second, upon receiving this security header, if the key refreshment counter is any number greater than zero and the key change bit is reset, the node calculates the new network key using the key derivation function. After the new network key is computed, the secondary node sends an ACK by setting the key change bit in the security header in its uplink message in the same or subsequent Superframe, to indicate that it is ready to change its network key. Third, once the primary node receives a set key change bit from all the secondary nodes, the primary node calls for key refreshment by setting key change bit and setting the key refreshment counter to zero in the next broadcast downlink message. The encryption/authentication for this packet is handled by the new network key and primary updates its session number and resets its frame counter. If the primary node does not receive an ACK (a set key change bit in data response) from all of the secondary nodes and the key refreshment counter has reached zero, the primary node uses a zero key refreshment counter and zero key exchange bit to cancel key refreshment as illustrated in state 1002 of FIG. 10. Fourth, when the secondary node receives a set key change bit from the primary, the secondary node increments its session number and starts using the new key as the network key. The secondary node uses the new network key to perform security operations on all subsequent uplink data messages. Fifth, if the primary node receives a message from all of the secondary nodes after the call for key refreshment, the primary node completes the key refreshment by resetting the key change bit to zero. At the end of this process, either the key refreshments fails, in case the primary does not receive one or more ACKs, or the key refreshment succeeds, where all the nodes have the new network key, an incremented session number and a reset frame counter.

Figure 11:
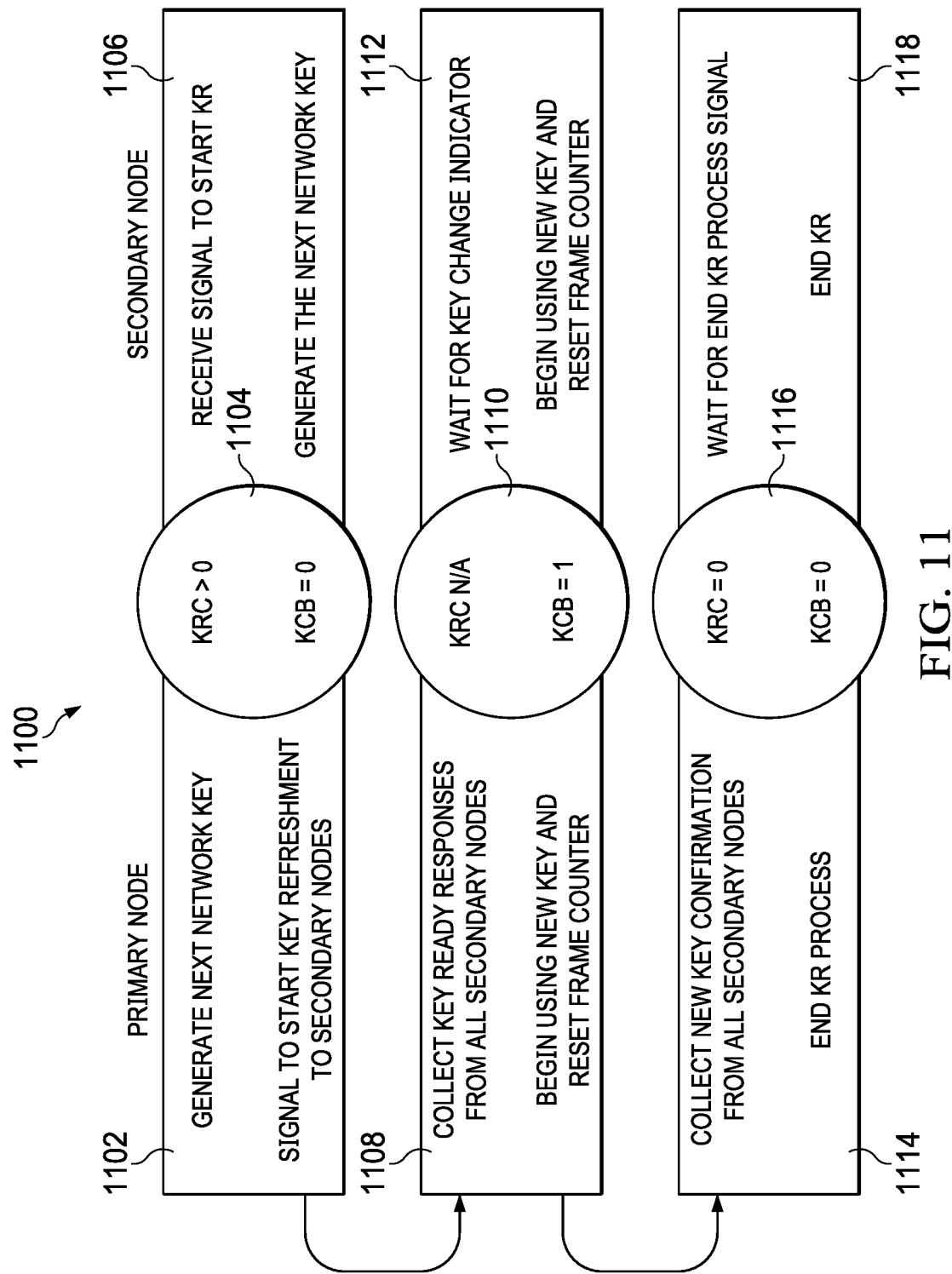
FIG. 11 is a diagram of key refreshment for data exchange in accordance with an example embodiment.

FIG. 11 is a diagram 1100 of key refreshment for data exchange in accordance with an example embodiment. In the diagram 1100, various primary node operations and secondary node operations are performed depending on the status of a key refreshment counter (KRC) value and a key change bit (KCB) value. If KRC>0 and KCB=0 (condition 1104), the primary node generates a next network key signal to start key refreshment to secondary node at block 1102. Also, the secondary node receives a signal to start key refreshment and generates the next network key at block 1106 in response to condition 1104. If KRC N/A and KCB=1 (condition 1110), the primary node collects key ready responses from all secondary nodes, begins using the new key, and resets its frame counter at block 1108. In some example embodiments, the primary node updates to the new key when KCB=1 is received from all secondary nodes. The primary node waits for KCB=1 until KRC=0 (or the countdown counter reaches zero). Also, the secondary node waits for key change indicator, begins using the new key, and resets its frame counter at block 1112 in response to condition 1110. If KRC=0 and KCB=0 (condition 1116), the primary node collects key confirmation from all secondary nodes and ends the key refreshment process at block 1114. Also, the secondary node waits for an end of the key refreshment process signal and end key refreshment at block 1118 in response to condition 1116.

Figure 12:
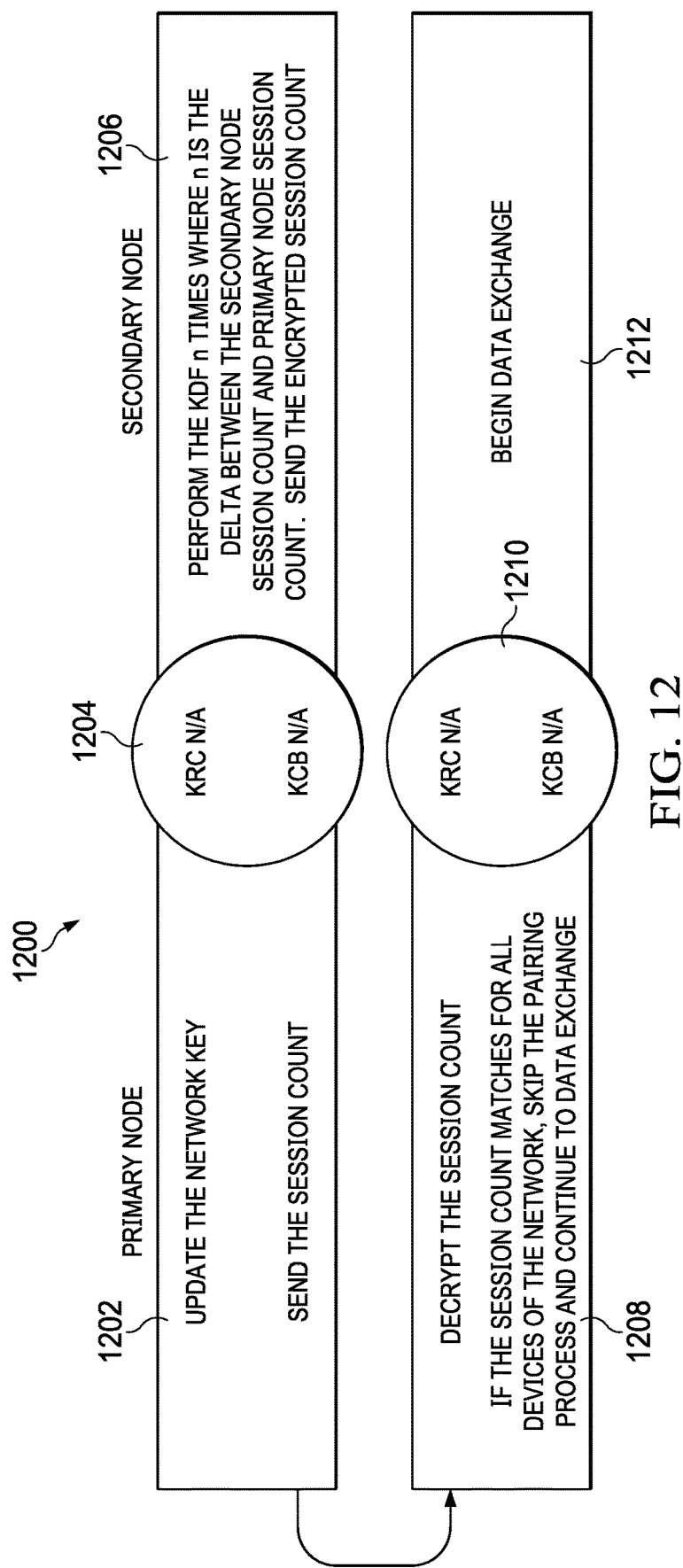
FIG. 12 is a diagram of key refreshment for joining a network in accordance with an example embodiment.

FIG. 12 is a diagram 1200 of key refreshment for joining a network in accordance with an example embodiment. In the diagram 1200, various primary node operations and secondary node operations are performed during unicast communications. The key refreshment of FIG. 12 is carried out in unicast communication when there are one or more nodes whose session number did not match with that of the primary node. This situation may arise when a new node joins the network or due to memory corruption in existing nodes. The key refreshment of FIG. 12 is performed in one Superframe for secondary nodes whose session numbers match with that of the primary node. In a unicast downlink message, the primary node uses the security header to initiate key refreshment during by setting the key change bit and resetting the key refreshment counter. When a secondary node receive this downlink message, it performs key derivation over the current network key and session number, updates the output as its network key, increments the session number, and replies with a unicast uplink message whose key change bit it set, which is used as an acknowledgement (ACK) for the key refreshment. When the primary node receives a pairing response from all its nodes with the ACK, it updates its network key, increments its session number, and resets the frame counter.

Returning to FIG. 12, the primary node updates the network key and sends the session count at block 1202 regardless of the condition 1204. At block 1206, the secondary node performs the key derivation function n times (n=the delta between the secondary node session count and the primary node session count), and sends the encrypted session count. At block 1208, the primary node decrypts the session count. If the session count matches for all devices of the network, the primary node skips the pairing process and continues to data exchange at block 1212. The key refreshment with session count described herein has several advantages. First, it provides an option to refresh keys without the network setup latency. The key refreshment can be initiated and completed during broadcast communication on-the-fly. The described key refreshment with session count also ensures that data exchange is not interrupted to refresh keys if the network is in the data exchange state. Another advantage is the described technique enables forward secrecy and backward secrecy by initiating a key exchange whenever a node joins or leaves a network. In addition, the described technique ensures that the network key is never transmitted as a plaintext or ciphertext wirelessly during key refreshment, which provides an added layer of protection from an attacker who is actively or passively observing the network. The new network key is computed by both the parties independently, reducing the overhead incurred form communicating the key. To summarize, example advantages of the key refreshment with session count technique include: limited number of key distributions; low overhead and latency; backward and forward secrecy; synchronization across devices without having a unique key for each connection (supporting additional features such as multi-hop extension); the technique meets network formation and data exchange timing targets (no interrupt to communication); the technique does not depend on user interference or the use of another networking protocol to establish and update keys; and the technique does not need additional hardware to establish or update keys.

In some example embodiments, a wireless interface (e.g., the wireless interface 404 in FIG. 4, the wireless interface 414 in FIG. 4, the wireless interface 404A in FIG. 5, the wireless interface 414A in FIG. 5), includes: network formation circuitry (e.g., network formation circuitry 408 or 418 in FIG. 4) configured to establish a wireless network between a primary node and a secondary node; data exchange circuitry (e.g., the data exchange circuitry 410 or 420 in FIG. 4) configured to perform data exchanges between the primary node and the secondary node using secure sessions; and key refreshment circuitry (e.g., the key refreshment circuitry 411 or 421 in FIG. 4) configured to derive a new network key for the network based on a pre-shared key and a current network key concatenated with a session count. The new key is derived during at least one of the secure sessions.

In some example embodiments, the key refreshment circuitry is configured to derive catch up network keys until reaching a current network key during at least one of the secure sessions. In some example embodiments, the secondary node is a first secondary node, and the key refreshment circuitry is configured to derive the catch up network keys without interrupting communications between the primary node and a second secondary node in the network. In some example embodiments, the data exchange circuitry is configured to use a MAC header that includes a frame counter value, a key refreshment counter value, and a key change bit. In some example embodiment, the network formation circuitry is configured to perform pairing operations that include storage of network and key exchange information, and the key refreshment circuitry is configured to derive the new network key without another key exchange.

In some example embodiments, the secondary node is a first secondary node, the network formation circuitry is configured to perform a scanning phase and a pairing phase, the scanning phase based on broadcast communications to identify a plurality of secondary nodes including the first secondary node, and the pairing phase based on unicast communications to exchange network and security information with the plurality of secondary nodes identified in the scanning phase. In some example embodiments, new network keys derived by the key refreshment circuitry enable forward secrecy, backward secrecy, and nonce-key pair reuse prevention. In some example embodiments, the key refreshment circuitry of a primary node is configured to derive the new network key during broadcast communications of the network (e.g., during a data exchange phase). In some example embodiment, a key refreshment circuitry of a primary node is configured to derive the new network key during unicast communications of the network (e.g., during a scanning and/or pairing phase).

In some example embodiments, a system (e.g., system 400 in FIG. 4, or system 500 in FIG. 5) includes modular subsystems (e.g., modular subsystems 412A-412N), each of the modular subsystems having a respective monitored electrical component (monitored electrical component 426).

The system also includes a controller (e.g., controller 402 in FIG. 4, or controller 402A in FIG. 4) for the modular subsystems; and a wireless management system for the modular subsystems, the wireless management system has: a primary node (e.g., the primary node 406 in FIG. 4) coupled to the controller; and secondary nodes (e.g., secondary node 416 in FIG. 4 or related components in the modular subsystem), each secondary node coupled to or included with a respective modular subsystem of the modular subsystems. The wireless management system is configured to: establish a network with the primary node and the secondary nodes; perform data exchanges between the primary node and the secondary node using secure sessions; and during a current secure session, derive a new network key for a subsequent secure session.

In some example embodiments, the wireless management system includes a wireless interface (e.g., wireless interfaces 404 or 414 in FIG. 1, wireless interfaces 404A or 414A) with key refreshment circuitry configured to derive the new network key for the subsequent session based on a pre-shared key and a current network key concatenated with a session count. In some example embodiments, the key refreshment circuitry is configured to derive catch up network keys until reaching the current network key during at least one of the secure sessions. In some example embodiments, the key refreshment circuitry is configured to derive the catch up network keys for a given secondary node without interrupting communications between the primary node and other secondary nodes in the network. In some example embodiments, data exchanges during a secure session use a MAC header that includes a frame counter value, a key refreshment counter value, and a key change bit. In some example embodiments, the network formation circuitry is configured to perform pairing operations that include storage of network and key exchange information, and the key refreshment circuitry is configured to derive the new network key without another key exchange. In some example embodiments, new network keys derived by the key refreshment circuitry enable forward secrecy, backward secrecy, and nonce-key pair misuse prevention. In some example embodiments, the monitored electrical components are rechargeable batteries.

In some example embodiments, a method includes establishing, by a wireless interface, a network with a primary node and a secondary node. The method also includes performing, by the wireless interface, data exchanges between the primary node and the secondary node using secure sessions. The method also includes during a current secure session, deriving, by the wireless interface, a new network key for a subsequent secure session of the network based on a pre-shared key and a current network key concatenated with a session count. In some example embodiments, the secondary node is a first secondary node, and the method further comprises deriving catch up network keys until reaching a current network key during at least one of the secure sessions without interrupting communications between the primary node and a second secondary node in the network. In some example embodiments, the method includes using a medium access control (MAC) header for secure session data exchanges, each MAC header including a frame counter value, a key refreshment counter value, and a key change bit. In some example embodiments, the method includes performing pairing operations that include storage of network and key exchange information, wherein deriving the new network key is performed without another key exchange.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A wireless interface, comprising:
   network formation circuitry configured to establish a wireless network between a primary node and a first secondary node;
   data exchange circuitry configured to perform data exchanges between the primary node and the first secondary node using secure sessions; and
   key refreshment circuitry configured to derive a new network key for the wireless network based on a pre-shared key, further based on a header, and further based on a current network key concatenated with a session count,
   wherein the header includes a frame counter value, a key refreshment counter value, and a key change bit, and
   wherein the key refreshment circuitry is configured to derive the new network key during at least one secure session of the secure sessions.

2. The wireless interface of claim 1, wherein the key refreshment circuitry is configured to derive catch up network keys until reaching the current network key during one or more of the secure sessions.

3. The wireless interface of claim 2, wherein the key refreshment circuitry is configured to derive the catch up network keys without interrupting data communications between the primary node and a second secondary node in the wireless network.

4. The wireless interface of claim 1, wherein the network formation circuitry is configured to perform pairing operations that include storage of network and key exchange information, and the key refreshment circuitry is configured to derive the new network key without another key exchange.

5. The wireless interface of claim 1, the network formation circuitry is configured to perform a scanning phase and a pairing phase, the scanning phase based on broadcast communications to identify a plurality of secondary nodes including the first secondary node, and the pairing phase based on unicast communications to exchange network and security information with the plurality of secondary nodes identified in the scanning phase.

6. The wireless interface of claim 1, wherein new network keys derived by the key refreshment circuitry enable forward secrecy, backward secrecy, and nonce-key pair misuse prevention.

7. The wireless interface of claim 1, wherein the key refreshment circuitry is part of the primary node and is configured to derive the new network key during broadcast communications of the wireless network.

8. The wireless interface of claim 1, wherein the key refreshment circuitry is part of the primary node and is configured to derive the new network key during unicast communications of the wireless network.

9. The wireless interface of claim 1, wherein the key refreshment circuitry is configured to derive the new network key without interrupting data communications between the primary node and a second secondary node during the at least one secure session.

10. A system, comprising:
modular subsystems, each of the modular subsystems having a respective monitored electrical component;
a controller for the modular subsystems; and
a wireless management system for the modular subsystems, the wireless management system having:
a primary node coupled to the controller; and
secondary nodes, each secondary node coupled to or included with a respective modular subsystem of the modular subsystems,
wherein the wireless management system is configured to:
establish a network with the primary node and the secondary nodes;
perform data exchanges between the primary node and the secondary nodes using secure sessions; and
during a current secure session, derive a new network key for a subsequent secure session based on a header,
wherein the header includes a frame counter value, a key refreshment counter value, and a key change bit.

11. The system of claim 10, wherein the wireless management system includes a wireless interface with key refreshment circuitry configured to derive the new network key for the subsequent secure session based on a pre-shared key and a current network key concatenated with a session count.

12. The system of claim 11, wherein the key refreshment circuitry is configured to derive catch up network keys until reaching the current network key during at least one of the secure sessions.

13. The system of claim 12, wherein the key refreshment circuitry is configured to derive the catch up network keys for a given secondary node without interrupting communications between the primary node and other secondary nodes in the network.

14. The system of claim 11, wherein the wireless management system is configured to perform pairing operations that include storage of network and key exchange information, and the key refreshment circuitry is configured to derive the new network key without another key exchange.

15. The system of claim 10, wherein new network keys derived by the wireless management system enable forward secrecy, backward secrecy, and nonce-key pair misuse prevention.

16. The system of claim 10, wherein the monitored electrical components are rechargeable batteries.

17. The system of claim 10, wherein the wireless management system is configured to derive the new network key without interrupting data communication from the secondary nodes to the primary node.

18. A method, comprising:
establishing, by a wireless interface, a network with a primary node and a first secondary node;
performing, by the wireless interface, data exchanges between the primary node and the first secondary node using secure sessions; and
during a current secure session, deriving, by the wireless interface, a new network key for a subsequent secure session of the network based on a pre-shared key, a header, and a current network key concatenated with a session count,
wherein the header includes a frame counter value, a key refreshment counter value, and a key change bit.

19. The method of claim 18, further comprising deriving catch up network keys until reaching the current network key during at least one of the secure sessions without interrupting communications between the primary node and a second secondary node in the network.

20. The wireless interface of claim 18, further comprising performing pairing operations that include storage of network and key exchange information, wherein deriving the new network key is performed without another key exchange.

21. The method of claim 18, wherein deriving the new network key occurs without interrupting data communications between the primary node and a second secondary node during the current secure session.

* * * * *